US009657126B2

(12) United States Patent
Bai et al.

(10) Patent No.: US 9,657,126 B2
(45) Date of Patent: May 23, 2017

(54) HIGHLY HYDROPHILIC AND HIGHLY OLEOPHOBIC MEMBRANE FOR OIL-WATER SEPARATION

(75) Inventors: Renbi Bai, Singapore (SG); Xiaoying Zhu, Singapore (SG)

(73) Assignee: National University of Singapore, Singapore (SG)

( * ) Notice: Subject to any disclaimer, the term of this patent is extended or adjusted under 35 U.S.C. 154(b) by 539 days.

(21) Appl. No.: 14/114,427

(22) PCT Filed: Apr. 27, 2012

(86) PCT No.: PCT/SG2012/000152
§ 371 (c)(1),
(2), (4) Date: Oct. 28, 2013

(87) PCT Pub. No.: WO2012/148359
PCT Pub. Date: Nov. 1, 2012

(65) Prior Publication Data
US 2014/0048478 A1    Feb. 20, 2014

Related U.S. Application Data

(60) Provisional application No. 61/479,938, filed on Apr. 28, 2011.

(51) Int. Cl.
| | |
|---|---|
| C08F 14/18 | (2006.01) |
| C08F 114/18 | (2006.01) |
| C08F 214/18 | (2006.01) |
| C08F 18/20 | (2006.01) |
| C08L 27/24 | (2006.01) |
| C08F 214/22 | (2006.01) |
| B01D 69/08 | (2006.01) |
| B01D 71/34 | (2006.01) |
| B01D 71/32 | (2006.01) |
| C08F 259/08 | (2006.01) |
| B01D 71/40 | (2006.01) |
| B01D 71/78 | (2006.01) |
| B01D 71/82 | (2006.01) |
| C08L 27/16 | (2006.01) |
| C02F 1/44 | (2006.01) |
| C08F 218/00 | (2006.01) |
| C08L 27/12 | (2006.01) |
| C08F 259/00 | (2006.01) |
| D06M 15/277 | (2006.01) |
| B01D 39/00 | (2006.01) |
| B01D 39/14 | (2006.01) |
| B01D 17/02 | (2006.01) |
| C02F 1/00 | (2006.01) |
| C02F 1/40 | (2006.01) |
| C02F 101/32 | (2006.01) |
| B01D 17/00 | (2006.01) |

(52) U.S. Cl.
CPC .......... *C08F 259/08* (2013.01); *B01D 69/087* (2013.01); *B01D 71/32* (2013.01); *B01D 71/34* (2013.01); *B01D 71/40* (2013.01); *B01D 71/78* (2013.01); *B01D 71/82* (2013.01); *C02F 1/444* (2013.01); *C08L 27/16* (2013.01); *B01D 17/085* (2013.01); *C02F 1/40* (2013.01); *C02F 2101/32* (2013.01)

(58) Field of Classification Search
CPC .................................................... C08F 259/08
See application file for complete search history.

(56) References Cited

U.S. PATENT DOCUMENTS

| | | | | |
|---|---|---|---|---|
| 5,641,844 A | * | 6/1997 | Thompson | C07C 69/653 427/244 |
| 5,880,204 A | * | 3/1999 | McCarthy | C08F 214/245 524/504 |
| 6,153,681 A | * | 11/2000 | Bekiarian | C08F 214/262 524/458 |
| 2004/0035782 A1 | | 2/2004 | Muller | |
| 2006/0047095 A1 | * | 3/2006 | Pacetti | A61L 31/10 526/242 |
| 2006/0148912 A1 | * | 7/2006 | Katsurao | B01D 67/002 521/27 |
| 2008/0105629 A1 | * | 5/2008 | Yang | C10G 33/06 210/799 |
| 2009/0032475 A1 | * | 2/2009 | Ferrer | B01D 17/10 210/799 |

(Continued)

FOREIGN PATENT DOCUMENTS

| | | |
|---|---|---|
| WO | WO-02/22712 A2 | 3/2002 |
| WO | WO 0222712 A2 * | 3/2002 |

OTHER PUBLICATIONS

Howarter et al. (Journal of Colloid and Interface Science, 2009, 329, 127-132).*

(Continued)

*Primary Examiner* — Clare Perrin
(74) *Attorney, Agent, or Firm* — Cesari and McKenna LLP

(57) ABSTRACT

A polymeric membrane for separating oil from water has a pore size of 0.005 μm to 5 μm, a thickness of 50 μm to 1,000 μm, a water contact angle of 0° to 60°, an oil contact angle of 40° to 100°. The membrane contains a hydrophobic matrix polymer and a functional polymer that contains a hydrophobic backbone and side chains. The side chains each have an oleophobic terminal segment and a hydrophilic internal segment. The weight ratio of the matrix polymer to the functional polymer is 99:1 to 1:9. Also disclosed is a method of making the above described membrane.

20 Claims, No Drawings

(56) References Cited

U.S. PATENT DOCUMENTS

| | | | | |
|---|---|---|---|---|
| 2009/0080073 | A1* | 3/2009 | Irita | B32B 27/08 |
| | | | | 359/485.01 |
| 2009/0101600 | A1* | 4/2009 | Shiki | B01D 67/0011 |
| | | | | 210/797 |
| 2009/0162662 | A1* | 6/2009 | Chang | B01D 67/0023 |
| | | | | 428/421 |
| 2009/0317621 | A1* | 12/2009 | Youngblood | C08F 259/08 |
| | | | | 428/319.3 |
| 2011/0183127 | A1* | 7/2011 | Kodama | B82Y 10/00 |
| | | | | 428/195.1 |
| 2011/0253621 | A1* | 10/2011 | Kim | B01D 65/08 |
| | | | | 210/500.39 |

OTHER PUBLICATIONS

Hamza et al "Development of Membranes with Low Surface Energy to Reduce the Fouling in Ultrafiltration Applications" Journal of Membrane Science vol. 131, pp. 217-227, 1997.

Kocherginsky et al "Demulsification of Water-In-Oil Emulsions Via Filtration Through a Hydrophilic Polymer Membrane" Journal of Membrane Science vol. 220, pp. 117-128, 2003.

Lang et al "Preparation and Characterization of PVDF-PFSA Blend Hollow Fiber UF Membrane" Journal of Membrane Science vol. 288, pp. 123-131, 2007.

Olatubi "Application of Membranes to Treatment of Water Based Exploration and Production Wastes" Texas A&M University, 2009.

Howarter et al "Amphiphile Grafted Membranes for the Separation of Oil-In-Water Dispersions" Journal of Colloid and Interface Science vol. 329, pp. 127-132, 2009.

* cited by examiner

HIGHLY HYDROPHILIC AND HIGHLY OLEOPHOBIC MEMBRANE FOR OIL-WATER SEPARATION

CROSS REFERENCE TO RELATED APPLICATION

This application claims priority from International Application No. PCT/SG2012/000152 filed on Apr. 27, 2012, which claims priority from U.S. Provisional Application No. 61/479,938 filed on Apr. 28, 2011, both applications being incorporated herein by reference in their entirety.

BACKGROUND

Polymeric membranes are useful in separating from water dispersed or emulsified oil, which has droplet sizes below 150 μm.

For example, ultrafiltration (UF) membranes, having a pore size of 0.01-0.1 μm, are used to treat oily industrial wastewater. See T. Bilstad and E. Espedal, Membrane Separation of Produced Water, Water Science and Technology 34 (9), 239-246 (1996). UF membranes have severe membrane fouling problems. See T. Bilstad and E. Espedal (1996); S. M. Santos and M. R. Wiesner (1997). Membrane fouling occurs when oil deposits onto a membrane surface or into its pores in a way that degrades the membrane's performance. It is a major obstacle to widespread application of UF membranes in treating oily wastewater.

Anti-fouling membranes are needed for effective and economical separation of oil from water.

SUMMARY

The present invention is based on an unexpected discovery of a highly hydrophilic and highly oleophobic membrane that effectively separates oil from water without significant oil fouling.

One aspect of this invention relates to a polymer of the following formula, which can be used to prepare the membrane of this invention:

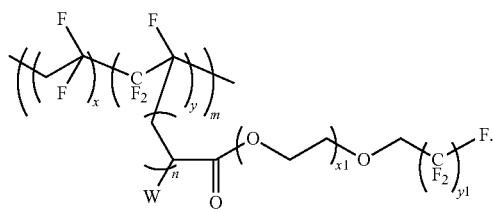

In this formula, W is a halogen, m is 10 to 1000 (e.g., 10 to 500 or 10 to 20), n is 1 to 1000 (e.g., 5 to 500 or 5 to 10), x is 50 to 1000 (e.g., 50 to 500 or 90 to 100), y is 1 to 200 (e.g., 1 to 100 or 5 to 10), $x_1$ is 1 to 100 (e.g., 5 to 50 or 5 to 10), and $y_1$ is 1 to 100 (e.g., 5 to 50 or 5 to 10).

As shown in the above formula, this polymer includes a polyvinylidene fluoride ("PVDF") backbone and polyacrylate side chains. As also shown in this formula, each of the side chains contains an oleophobic terminal segment, i.e., a perfluoroalkyl group, and a hydrophilic internal segment, i.e., a polyethylene glycol group.

Another aspect of this invention relates to a membrane containing a matrix polymer that is hydrophobic and a functional polymer that is both hydrophilic and oleophobic. The functional polymer includes a hydrophobic backbone and side chains each containing an oleophobic terminal segment and a hydrophilic internal segment. Examples of the functional polymer include, but are not limited to, the polymers encompassed by the formula set forth above.

The just-mentioned membrane can be prepared by a method including the following steps: (i) dissolving a matrix polymer and a functional polymer in a blend solvent to obtain a blend solution, (ii) degassing the blend solution to obtain a deaerated solution, and (iii) immersing the deaerated solution into a coagulation liquid to form the polymeric membrane. If desired, one can perform the immersing step by extruding the deaerated solution into the coagulation liquid to form a hollow fiber membrane.

The membrane of this invention preferably has a pore size of 0.005 μm to 5 μm (e.g., 0.05 μm to 0.5 μm or 0.1 μm to 0.3 μm), a thickness of 50 μm to 1,000 μm (e.g., 100 μm to 500 μm or 250 μm to 350 μm), a water contact angle of 0° to 60° (e.g., 5° to 55° or 10° to 50°), and an oil contact angle of 40° to 100° (e.g., 40° to 95° or 40° to 90°). The weight ratio of the matrix polymer to the functional polymer broadly ranges from 99:1 to 1:9 (e.g., 95:5 to 6:4 or 9:1 to 7:3).

The details of one or more embodiments of the invention are set forth in the description below. Other features, objects, and advantages of the invention will be apparent from the description, and also from the claims.

DETAILED DESCRIPTION

This invention provides a porous membrane for separating oil from water. The membrane is both highly hydrophilic and highly oleophobic, allowing water to pass through it while leaving oil behind.

The membrane, which can be a flat sheet, a hollow fiber, or a bead, has a pore size of 0.005-5 μm and a thickness of 50-1000 μm.

The hydrophilicity of the membrane can be quantified by water contact angle, which is preferably 0-60°. Its oleophobicity, on the other hand, can be quantified by oil contact angle, which is preferably 40-100°.

The membrane contains both a matrix polymer and a functional polymer.

The matrix polymer, which is hydrophobic, provides support for the membrane. Examples of the matrix polymer include, but are not limited to, PVDF, polytetrafluoroethylene, polycarbonate, polyethylene terephthalate, polypropelene, polyamide, and a combination of two or more of these polymers.

PVDF, as a matrix polymer, can be a homopolymer, a copolymer, a terpolymer, a higher polymer, or a combination thereof. It can contain vinylidene fluoride units greater than 70 wt. % (e.g., 75 wt. % or higher). An exemplary PVDF copolymer for use as a matrix polymer contains 71 to 99 wt. % vinylidene fluoride units and 1 to 29 wt. % hexafluoropropylene units. An operative PVDF molecular weight range is $1.0 \times 10^4$ to $1.0 \times 10^6$ (preferably $1.0 \times 10^5$ to $1.0 \times 10^6$, and more preferably $4.0 \times 10^5$ to $8.0 \times 10^5$). A typical commercially available PVDF has a molecular weight of $1 \times 10^5$ to $1 \times 10^6$. For example, Solef® PVDF from Solvay has a molecular weight of $4.0 \times 10^5$ to $5.5 \times 10^5$.

Turning to the functional polymer, it contains a hydrophobic backbone and side chains that are both hydrophilic and oleophobic. Like its side chains, the functional polymer is both hydrophilic and oleophobic.

The backbone can be PVDF, polytetrafluoroethylene, polycarbonate, polyethylene terephthalate, polypropelene, polyamide, or a combination thereof. In one embodiment, the backbone contains PVDF that has a molecular weight of $1.0 \times 10^4$ to $1.0 \times 10^6$ (preferably $5.0 \times 10^4$ to $5.0 \times 10^5$, and more preferably $1.0 \times 10^5$ to $2.5 \times 10^5$). An exemplary PVDF backbone contains 71 to 99 wt. % vinylidene fluoride units and 1 to 29 wt. % chlorotrifluoroethlyene units.

As for the side chains, each of them contains an oleophobic terminal segment and a hydrophilic internal segment.

An example of the terminal segment is a perfluoroalkyl group having a molecular weight of 40 to 4000 (preferably 200 to 2000, and more preferably 200 to 400).

Examples of the internal segment include polyethylene glycol, poly(N-vinylpyrrolidone), polyacrylamide, polyacrylacid, polystyrenesulfonate, or a combination thereof. These internal segments have a molecular weight of 40 to 4500 (preferably 200 to 2500, and more preferably 220 to 440).

The following formula encompasses functional polymers that can be used for preparing the membrane of this invention:

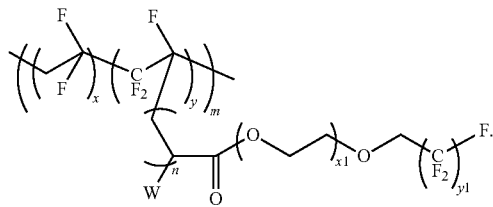

In this formula, W is a halogen, i.e., F, Cl, Br, and I; m can be 10 to 1000; n can be 1 to 1000; x can be 50 to 1000; y can be 1 to 200; $x_1$ can be 1 to 100; and $y_1$ can be 1 to 100.

These exemplary functional polymers, both hydrophilic and oleophobic, each include a PVDF backbone and polyacrylate side chains. The side chains each contain a perfluoroalkyl terminal segment and a polyethylene glycol internal segment.

These functional polymers can be obtained as follows:

PVDF, e.g., poly(vinylidene fluoride-co-chlorotrifluoroethylene), is dissolved in a solvent to obtain a polymer solution. The solvent can be N-methyl-2-pyrrolidone, dimethyl formamide, dimethyl acetamide, tetramethyl urea, dimethyl sulfoxide, triethyl phosphate, or a combination thereof.

To the PVDF solution are added a ligand and a catalyst, followed by a monomer.

The ligand can be 1,1,1-tris(2-bromoisobutyryloxymethyl)ethane, 10-undecenyl 2-bromoisobutyrate, 2-hydroxyethyl 2-bromoisobutyrate, 4,4'-dinonyl-2,2'-dipyridyl, bis[2-(2'-bromoisobutyryloxy)ethyl]disulfide, dipentaerythritol hexakis(2-bromoisobutyrate), dodecyl 2-bromoisobutyrate, ethylene bis(2-bromoisobutyrate), 1,1,4,7,7-pentamethyldiethylenetriamine, octadecyl 2-bromoisobutyrate, pentaerythritol tetrakis(2-bromoisobutyrate), tris(2-pyridylmethyl)amine, tris[2-(dimethylamino)ethyl]amine, or a combination thereof.

The catalyst can be a copper catalyst, e.g., CuCl and CuBr.

The monomer can be styrene, acrylate, acrylamide, acrylonitrile, or a combination thereof, all of which contain at least a functional group that stabilizes propagating radicals. When an acrylate monomer is used, it can be methyl acrylate, ethyl acrylate, butyl acrylate, tert-butyl acrylate, 2-ethylhexyl acrylate, or a combination thereof.

The resulting mixture is heated to give a graft product, which is optionally separated or even purified from the mixture.

The graft product thus obtained is then hydrolyzed by an acid, preferably in a solvent at an elevated temperature. The acid can be HCl, $H_2SO_4$, p-toluenesulfonic acid, trifluoroacetic acid, or a combination thereof. The solvent can be toluene, N-methyl-2-pyrrolidone, dimethyl formamide, dimethyl acetamide, tetramethyl urea, dimethyl sulfoxide, triethyl phosphate, or a combination thereof.

A hydrolyzed product thus obtained is optionally separated/purified and dried.

The hydrolyzed product is then coupled with a surfactant in the presence of a coupling reagent and a catalyst to give a functional polymer in a solvent. Examples of the solvent include, but are not limited to, N-methyl-2-pyrrolidone, dimethyl formamide, dimethyl acetamide, tetramethyl urea, dimethyl sulfoxide, triethyl phosphate, and a combination thereof.

The surfactant is both hydrophilic and oleophobic. It can be a fluorosurfactant containing a hydroxyl group.

The coupling reagent can be dicyclohexylcarbodiimide, diisopropylcarbodiimide, ethyl-(N',N'-dimethylamino)propylcarbodiimidehydrochloride, or a combination thereof.

The catalyst can be 4-(dimethylamino)-pyridine, beta, beta,beta-tribromoethyl ester, tributylphosphine, scandium trifluoromethanesulfonate, trimethylsilyl trifluoromethanesulfonate, diphenylammonium trifluoromethanesulfonate, petafluoroanilinium trifluoromethanesulfonate, or a combination thereof.

The functional polymer is optionally separated/purified and dried.

The functional polymer thus made can be used to prepare the membrane of this invention following the procedures described below:

A blend solution is obtained by dissolving a matrix polymer and a functional polymer (e.g., 10 to 30 wt. % combined) in a blend solvent, and, optionally, stirred (e.g., at 800 rpm) for a extended period of time (e.g., 2 hours). It is preferred that the blend solution be prepared in an air-tightly sealed vessel to prevent evaporation of the solvent.

A blend solvent is a solvent that can dissolve a matrix polymer and a functional polymer and is miscible with a coagulation liquid. Examples of the blend solvent include, but are not limited to, tetrahydrofuran, methyl ethyl ketone, dimethyl formamide, dimethyl acetamide, tetramethyl urea, dimethyl sulfoxide, trimethyl phosphate, N-methyl-2-pyrrolidone, butyrolacetone, isophorone, carbitor acetate, or a mixture thereof. If necessary, one can obtain a homogeneous polymer blend solution by heating and subsequent cooling and filtration.

The blend solution thus obtained is then degassed to free any air bubbles entrapped therein, e.g., through centrifuging this solution. The time needed for degassing depends on viscosity of the solution.

After degassing, the polymer blend solution is immersed, preferably at 20 to 100° C., and more preferably at 60 to 80° C., into a coagulation liquid to form a membrane of this invention.

The coagulation liquid, i.e., a coagulation nonsolvent as generally known in the field, is a liquid that is miscible with a blend solvent and its addition to a blend solution results in formation of a polymeric membrane. The coagulation liquid can be water, methanol, ethanol, propanol, isopropanol, or a mixture thereof.

If desired, the immersion of a blend solution and a coagulation liquid can be performed by extruding the blend solution into the coagulation liquid to form a hollow fiber membrane, using a wet spinning apparatus. For example, through a spinneret, a blend solution is extruded into a coagulation liquid with simultaneous delivery by a syringe pump of the same or a different coagulation liquid to the lumen of the fiber thus formed. The distance between the surface of the coagulation liquid and the outlet of the spinneret, i.e., the air gap, can be 0 to 50 cm, depending on the pore size and surface roughness of the hollow fiber membrane to be prepared. Generally, a greater air gap results in a membrane having a lower permeation flux and a higher solute separation performance. The flow rate of the blend solution extruding into the coagulation liquid can be controlled by compressed nitrogen gas. The coagulation liquid passing the lumen of the fiber can be controlled by a syringe pump that feeds the coagulation liquid to the spinneret.

A person skilled in the art can determine without undue experimentation conditions for preparing the membrane of this invention, such as relative concentrations of all reactants, temperature for mixing/reaction, duration of reaction/mixing/degassing, flow rates of polymer blend solutions and coagulation liquids, and sizes of filters and spinnerets.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

EXAMPLE 1

Preparation of a Functional Polymer

Poly(vinylidene fluoride-co-chlorotrifluoroethylene) was dissolved in N-methyl-2-pyrrolidone in an air-tight flask purged with $N_2$. The mixture was stirred at 200 to 1000 rpm and heated at 60 to 90° C. to obtain a homogeneous and viscous polymer solution. The polymer concentration was 10-30 wt. %.

To the above solution were added CuCl (1-5 wt. %) and pentamethyldiethylenetriamine (2-10 wt. %), followed by tert-butyl acrylate (10 to 50 wt. %).

The resulting mixture was heated to 50 to 90° C. for 0.5 to 4 hours. Upon cooling, the mixture was poured into water to precipitate a graft product containing polyacrylate side chains, which was washed with water.

The graft product (1 to 10 g) was stirred in p-toluenesulfonic acid toluene solution (100 mL, 10-30 wt. %) at 80 to 95° C. for 4 to 8 hours. Upon cooling, the acidic solution was poured into water, washed with water, and dried in a freeze drier to yield a hydrolyzed product containing poly(acrylic acid) side chains.

To the hydrolyzed product solution in dimethylformamide (4-8 wt. %) were added Zonyl® FSN-100 fluorosurfactant (molecular weight 950, 2-4 wt. %), dicyclohexylcarbodiimide (0.5-1 wt. %), and 4-(dimethylamino)-pyridine (0.01-0.05 wt. %). The resulting mixture was stirred at an ambient temperature for 48-120 hours, then poured into water, washed with water and dried in a freeze drier to yield a functional polymer.

EXAMPLE 2

Preparation of a Polymer Blend Solution

To dimethylformamide were added PVDF and the functional polymer prepared in Example 1 (10-30 wt. % combined, PVDF: functional polymer=7:3) in a tightly sealed vessel that was heated to 70 to 100° C. The mixture was stirred at 400 to 1000 rpm for 1-5 hours and cooled to an ambient temperature to obtain a blend solution.

The blend solution was filtered in an air-tight stainless steel dope tank and was forced, under 2 bar pressure by compressed nitrogen gas, through a 15 μm stainless steel filter.

The filtered blend solution was degassed by centrifuging the solution at 3000 to 8000 rpm for 5 to 10 minutes.

EXAMPLE 3

Fabrication of a Hollow Fiber Membrane

A spinning apparatus containing a spinneret having an OD/ID of 1.5/0.5 mm was used to extrude the blend solution of Example 2, driving by compressed nitrogen gas, into a water bath to form a hollow fiber membrane. Simultaneously, a syringe pump fed water into the lumen of the fiber through an annular ring inside the spinneret.

The air gap was 0.5 cm. Compressed nitrogen gas was used to keep the flow rate of the polymer blend solution at 4 mL/min. The syringe pump was used to control the flow rate of water at 1 mL/min. The coagulant temperature was 60 to 80° C.

Finally, the hollow fiber membrane thus obtained was dried in air.

EXAMPLE 4

Measurement of Oil Removal Efficiency

The hollow fiber membrane prepared in Example 3 was studied as to its efficiency in removing emulsion crude oil from water.

A membrane filtration experiment was conducted on a dead-end filtration system, powered by a micro pump (IS-MATEC IP65) with a pump head (Micropump, 170-000) providing motivation flow and pressure. Oil concentrations were detected with the TOC analyzer (SHIMADZU, TOC-V). Permeate weights were measured by a digital balance (M.R.C., ββ-1550) that was linked to a computer for data collection and permeate flux calculation. An oil/water emulsion (500 ppm) was prepared by mixing 0.5 g of hexadecane and 1 L water in a homogenizer (Cole-Parmer, Labgen 700) at 14,000 rpm for 20 min.

It was unexpected that the membrane separated oil from water most efficiently as shown in the results below:

| Oil removal efficiency 99% | |
|---|---|
| Cycle 1: | |
| $J_0$ | 54.93 L · m$^{-2}$ · h$^{-1}$ |
| RFD | 49% |
| RFR | 71% |
| RFR_B | 99% |
| Cycle 2: | |
| $J_0$ | 54.49 L · m$^{-2}$ · h$^{-1}$ |
| RFD_1 | 52% |
| RFR_1 | 68% |
| RFR_B1 | 99% |

$J_0$ is permeate flux, RFD is relative flux decline of cycle 1, RFR is relative flux recovery of Cycle 1, RFR_B is relative flux recovery after 30 min backwashing of Cycle 1, RFD_1 is relative flux decline of cycle 2, RFR_1 is relative flux recovery of Cycle 2, and RFR_B1 is relative flux recovery after 30 min backwashing of Cycle 2.

Also unexpectedly, the membrane demonstrated strong resistance to oil fouling as evidenced by low relative flux decline and high relative flux recovery.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to achieve the purpose of separating oil from water, one skilled in the art can design a membrane that contains any combination of hydrophilic side chains, oleophobic side chains, and hydrophilic and oleophobic side chains. Further, the ratios, lengths, and densities of these side chains can be so engineered to allow water to pass through the membrane while leaving oil behind.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A polymer of the following formula:

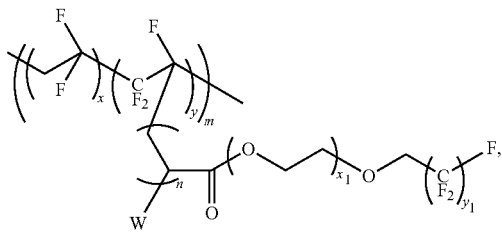

wherein W is a halogen, m is 10 to 1000, n is 1 to 1000, x is 50 to 1000, y is 1 to 200, $x_1$ is 1 to 100, and $y_1$ is 1 to 100.

2. The polymer of claim 1, wherein m is 10 to 500, n is 5 to 500, x is 50 to 500, y is 1 to 100, $x_1$ is 5 to 50, and $y_1$ is 5 to 50.

3. The polymer of claim 2, wherein m is 10 to 20, n is 5 to 10, x is 90 to 100, y is 5 to 10, $x_1$ is 5 to 10, and $y_1$ is 5 to 10.

4. A polymeric membrane for separating oil from water, the polymer membrane comprising:
a matrix polymer that is hydrophobic, and
a functional polymer that contains a hydrophobic backbone and side chains, the side chains each having an oleophobic terminal segment and a hydrophilic internal segment, the functional polymer being of the following formula:

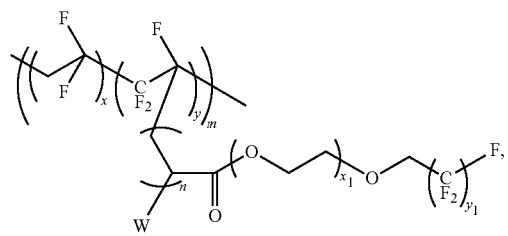

in which W is a halogen, m is 10 to 1000, n is 1 to 1000, x is 50 to 1000, y is 1 to 200, $x_1$ is 1 to 100, and $y_1$ is 1 to 100,
wherein the polymeric membrane has a pore size of 0.005 μm to 5 μm, a thickness of 50 μm to 1,000 μm, a water contact angle of 0° to 60°, an oil contact angle of 40° to 100°, and a weight ratio of the matrix polymer to the functional polymer of 99:1 to 1:9.

5. The polymer membrane of claim 4, wherein the polymer membrane has a pore size of 0.05 μm to 0.5 μm, a thickness of 100 μm to 500 μm, a water contact angle of 5° to 55°, an oil contact angle of 40° to 95°, and a weight ratio of the matrix polymer to the functional polymer of 95:5 to 6:4.

6. The polymer membrane of claim 5, wherein the polymer membrane has a pore size of 0.1 μm to 0.3 μm, a thickness of 250 μm to 350 μm, a water contact angle of 10° to 50°, an oil contact angle of 40° to 90°, and a weight ratio of the matrix polymer to the functional polymer of 9:1 to 7:3.

7. The polymer membrane of claim 4, wherein the matrix polymer is polyvinylidene fluoride, polytetrafluoroethylene, polycarbonate, polyethylene terephthalate, polypropelene, polyamide, or a combination thereof.

8. The polymer membrane of claim 7, wherein the polymer membrane has a pore size of 0.05 μm to 0.5 μm, a thickness of 100 μm to 500 μm, a water contact angle of 5° to 55°, an oil contact angle of 40° to 95°, and a weight ratio of the matrix polymer to the functional polymer of 95:5 to 6:4.

9. The polymer membrane of claim 8, wherein the polymer membrane has a pore size of 0.1 μm to 0.3 μm, a thickness of 250 μm to 350 μm, a water contact angle of 10° to 50°, an oil contact angle of 40° to 90°, and a weight ratio of the matrix polymer to the functional polymer of 9:1 to 7:3.

10. The polymer membrane of claim 7, wherein the matrix polymer is polyvinylidene fluoride, and the functional polymer is the polymer of claim 1.

11. The polymer membrane of claim 10, wherein the polymer membrane has a pore size of 0.05 μm to 0.5 μm, a thickness of 100 μm to 500 μm, a water contact angle of 5° to 55°, an oil contact angle of 40° to 95°, and a weight ratio of the matrix polymer to the functional polymer of 95:5 to 6:4.

12. The polymer membrane of claim 11, wherein the polymer membrane has a pore size of 0.1 μm to 0.3 μm, a thickness of 250 μm to 350 μm, a water contact angle of 10° to 50°, an oil contact angle of 40° to 90°, and a weight ratio of the matrix polymer to the functional polymer of 9:1 to 7:3.

13. The polymer membrane of claim 7, wherein the matrix polymer is polyvinylidene fluoride, and the functional polymer is the polymer of claim 2.

14. The polymer membrane of claim 13, wherein the polymer membrane has a pore size of 0.05 μm to 0.5 μm, a thickness of 100 μm to 500 μm, a water contact angle of 5° to 55°, an oil contact angle of 40° to 95°, and a weight ratio of the matrix polymer to the functional polymer of 95:5 to 6:4.

15. The polymer membrane of claim 14, wherein the polymer membrane has a pore size of 0.1 μm to 0.3 μm, a thickness of 250 μm to 350 μm, a water contact angle of 10° to 50°, an oil contact angle of 40° to 90°, and a weight ratio of the matrix polymer to the functional polymer of 9:1 to 7:3.

16. The polymer membrane of claim 7, wherein the matrix polymer is polyvinylidene fluoride, and the functional polymer is the polymer of claim 3.

17. The polymer membrane of claim 16, wherein the polymer membrane has a pore size of 0.05 μm to 0.5 μm, a thickness of 100 μm to 500 μm, a water contact angle of 5° to 55°, an oil contact angle of 40° to 95°, and a weight ratio of the matrix polymer to the functional polymer of 95:5 to 6:4.

18. The polymer membrane of claim 17, wherein the polymer membrane has a pore size of 0.1 μm to 0.3 μm, a thickness of 250 μm to 350 μm, a water contact angle of 10° to 50°, an oil contact angle of 40° to 90°, and a weight ratio of the matrix polymer to the functional polymer of 9:1 to 7:3.

19. A method for making polymeric membrane of claim 4 comprising:
   dissolving a matrix polymer and a functional polymer in a blend solvent to obtain a blend solution,
   degassing the blend solution to obtain a deaerated solution, and
   immersing the deaerated solution into a coagulation solvent to form the polymeric membrane, wherein the matrix polymer is hydrophobic and the functional polymer contains a hydrophobic backbone and hydrophilic side chains, the side chains each having an oleophobic terminal segment and a hydrophilic internal segment, the functional polymer being of the following formula:

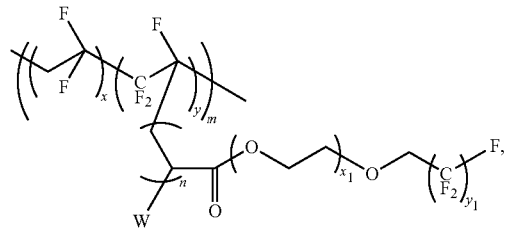

wherein W is a halogen, m is 10 to 1000, n is 1 to 1000, x is 50 to 1000, y is 1 to 200, x1 is 1 to 100, and y1 is 1 to 100.

20. The method of claim 19, wherein the immersing step is performed by extruding the deareated solution into the coagulation solvent to form a hollow fiber membrane.

* * * * *